(12) United States Patent
Rosenberg et al.

(10) Patent No.: US 9,442,253 B2
(45) Date of Patent: Sep. 13, 2016

(54) OPTICAL SHUFFLING

(75) Inventors: Paul Kessler Rosenberg, Sunnyvale, CA (US); David A. Fattal, Mountain View, CA (US); Marco Fiorentino, Mountain View, CA (US); Raymond G. Beausoleil, Redmond, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/396,429

(22) PCT Filed: Jun. 28, 2012

(86) PCT No.: PCT/US2012/044516
§ 371 (c)(1),
(2), (4) Date: Oct. 23, 2014

(87) PCT Pub. No.: WO2014/003749
PCT Pub. Date: Jan. 3, 2014

(65) Prior Publication Data
US 2015/0093074 A1    Apr. 2, 2015

(51) Int. Cl.
*G02B 6/34*    (2006.01)
*G02B 6/26*    (2006.01)
(Continued)

(52) U.S. Cl.
CPC .............. *G02B 6/34* (2013.01); *G02B 5/1809* (2013.01); *G02B 6/3534* (2013.01);
(Continued)

(58) Field of Classification Search
CPC .... G02B 6/34; G02B 6/3556; G02B 6/3534; G02B 5/1809
USPC .............................................. 385/37, 18, 47
See application file for complete search history.

(56) References Cited

U.S. PATENT DOCUMENTS 4,362,359 A * 12/1982 Dammann ......... G02B 6/29307
370/200
4,626,069 A * 12/1986 Dammann ........... G02B 6/2848
359/569
(Continued)

FOREIGN PATENT DOCUMENTS

CN    1338647 A    3/2002
EP    1182905 B1    11/2003
(Continued)

OTHER PUBLICATIONS

Chase, C. et al., High-contrast Gratings—Thin, Sub-wavelength Gratings Bounce Light Better [online], Retrieved from the Internet <http://light.eecs.berkeley.edu/cch/HCSWG.html > [retrieved on Jun. 28, 2012] 3 pages.

(Continued)

*Primary Examiner* — Robert Tavlykaev
(74) *Attorney, Agent, or Firm* — Hewlett Packard Enterprise Patent Department

(57) ABSTRACT

Techniques relating to optical shuffling are described herein. In an example, a system for shuffling a plurality of optical beams is described. The system includes a plurality of sources to output respective beams of light. The system further includes a plurality of receivers to receive respective beams of light. The system further includes a shuffling assembly including a plurality of sub-wavelength grating (SWG) sections. Each of the plurality of SWG sections is for defining optical paths of the plurality of beams. The plurality of SWG sections includes at least one reflecting SWG section to reflect and direct light from a respective one of the plurality of sources toward a respective one of the plurality of receivers.

15 Claims, 10 Drawing Sheets

(51) Int. Cl.
*G02B 6/42* (2006.01)
*G02B 6/35* (2006.01)
*G02B 5/18* (2006.01)
*H04Q 11/00* (2006.01)
*G02B 6/293* (2006.01)
*G02B 26/08* (2006.01)

(52) U.S. Cl.
CPC ........ *G02B 6/3556* (2013.01); *G02B 6/29319* (2013.01); *G02B 26/0808* (2013.01); *G02F 2201/30* (2013.01); *G02F 2203/18* (2013.01); *G02F 2203/24* (2013.01); *H04Q 11/0005* (2013.01); *H04Q 2011/0032* (2013.01)

(56) References Cited

U.S. PATENT DOCUMENTS

| | | | |
|---|---|---|---|
| 6,337,760 | B1 | 1/2002 | Huibers et al. |
| 6,345,133 | B1 | 2/2002 | Morozov |
| 6,426,837 | B1 | 7/2002 | Clark et al. |
| 6,959,129 | B2 | 10/2005 | He et al. |
| 7,039,267 | B2 * | 5/2006 | Ducellier ........... G02B 6/29395 385/17 |
| 2007/0076163 | A1 | 4/2007 | Crossland et al. |
| 2009/0257063 | A1 | 10/2009 | Smith et al. |
| 2011/0188119 | A1 * | 8/2011 | Mathai ................ G02B 27/44 359/573 |
| 2011/0188806 | A1 * | 8/2011 | Peng .................. G02B 6/12007 385/37 |
| 2011/0261856 | A1 | 10/2011 | Fattal et al. |
| 2012/0027347 | A1 * | 2/2012 | Mathai ................ G02B 6/124 385/37 |
| 2012/0027350 | A1 * | 2/2012 | Fu ............................ G02B 6/34 385/37 |
| 2012/0105962 | A1 | 5/2012 | Fattal et al. |
| 2012/0194911 | A1 | 8/2012 | Li et al. |
| 2013/0136389 | A1 * | 5/2013 | Luo ................... G02B 6/12007 385/11 |
| 2013/0286483 | A1 | 10/2013 | Fiorentino et al. |

FOREIGN PATENT DOCUMENTS

| | | | | |
|---|---|---|---|---|
| JP | 201199936 | A | 5/2011 | |
| TW | 200723787 | A | 6/2007 | |
| TW | 201140149 | A | 11/2011 | |
| WO | WO 2011/008216 | A1 * | 1/2011 | ............... G02B 5/18 |
| WO | WO-2011093893 | A1 | 8/2011 | |

OTHER PUBLICATIONS

Fattal, D. et al., A Silicon Lens for Integrated Free-Space Optics, Integrated Photonics Research, Silicon and Nanophotonics, OSA Technical Digest (CD), Optical Society of America, 2011, 4 pages.

Kroker, S. et al., Reflective Cavity Couplers Based on Resonant Waveguide Gratings, Aug. 15, 2011, vol. 19, Issue 17, pp. 16466-16479.

PCT International Search Report & Written Opinion, Jan. 3, 2013; PCT Patent Application No. PCT/US2012/044516, 9 pages.

Peng, Z. et al., Reflective Silicon Binary Diffraction Grating for Visible Wavelengths, Apr. 15, 2011, Optical Society of America, Optics Letters, vol. 36, No. 8, pp. 1515-1517.

* cited by examiner

OPTICAL SHUFFLING

BACKGROUND

Many applications depend on sending and receiving relatively large amounts of data. Technologies based on transmitting data using light are a convenient option that offers high network bandwidth. There are a number of devices that use light for transmitting information.

Networking equipment may contain a large number of optical sources coupled to an equally large number of optical receivers through optical fibers. Optical sources, such as, optical engines, may be coupled to optical receivers through optical fibers.

It is often desirable to switch or 'shuffle' the optical signals carried in optical fibers within a multi-fiber optical connector. This task is often achieved by physically separating, or "breaking out" the individual fibers from one connector and re-routing them into a different configuration in one or more additional optical connectors. For example, in a blade computer system, it may be desired to route signals from the output of one processor to the input of two or more switches in order to provide redundancy.

BRIEF DESCRIPTION OF THE DRAWINGS

In order that the present disclosure may be well understood, various examples will now be described with reference to the following drawings.

DETAILED DESCRIPTION

Figure 1:
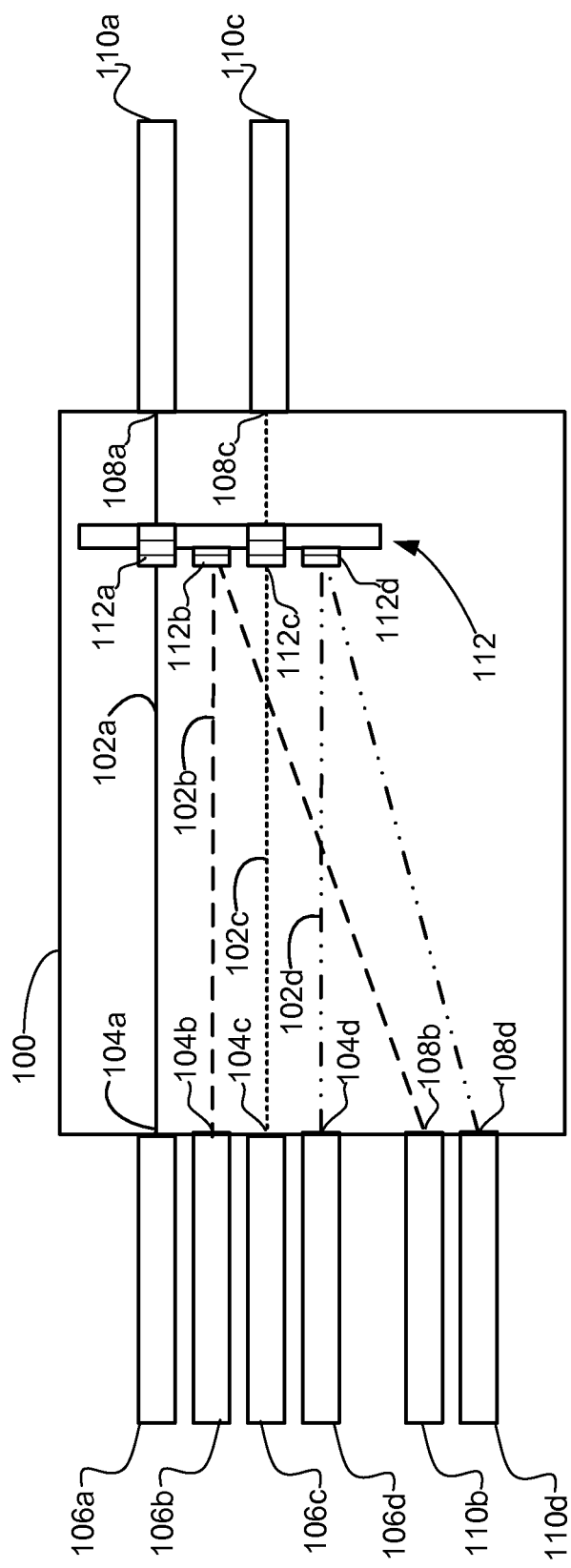
FIG. 1 schematically shows a perspective view of an environment including an example of an optical shuffle system.

In the following, numerous details are set forth to provide an understanding of the examples disclosed herein. However, it will be understood that the examples may be practiced without these details. Further, in the following detailed description, reference is made to the accompanying figures, in which various examples are shown by way of illustration. While a limited number of examples are illustrated, it will be understood that there are numerous modifications and variations therefrom.

In this regard, directional terminology, such as "top," "bottom," "front," "back," "left," "right," "vertical," etc., is used with reference to the orientation of the figures being described. Because disclosed components can be positioned in a number of different orientations, the directional terminology is used for purposes of illustration and is in no way limiting. In the drawings, the dimensions of layers and regions as well as some surface angles are exaggerated for clarity of illustration. Like numerals are used for like and corresponding parts of the various figures.

In addition, it should be understood that the systems illustrated in the Figures are not drawn to scale, but instead, are drawn to clearly show the relationships between the various components of the systems illustrated herein.

While a limited number of examples are illustrated, it will be understood that there are numerous modifications and variations therefrom.

As set forth above, it is often desirable to switch or "shuffle" optical signals. In some systems shuffling may produce complex routing of very dense sets of optical signals carrying data. Examples of such complex routing may be encountered in the interior of computer and switch cabinets. A system architecture may consist of a set of printed circuit boards (PCB) that plug into a back or mid plane. Other examples of such complex routing may be encountered in communication between blade servers, which may be managed through a set of switches to which many or all of the blade servers are connected.

In some systems for optical communication, routing and managing optical shuffling is implemented through optical fibers. The optical connection may be implemented by break-out cables that separate multiple fibers in a connector into smaller groups of fibers, and individual fibers, in order to route signals to specific locations. For example, in some systems for optical communication, break-out boxes and patch panels are used to produce a desired cable routing pattern. For example, a multi-fiber optical connector may be plugged into a connector attached to the break-out box. Inside the box, several or individual fibers may be separated from the incoming connector and routed to other connectors in the box. Individual fibers may be routed back to another location on the incoming connector. The placement of the optical cables may substantially contribute to the expenses in constructing a specific system using optical connections.

In other systems for optical communication, routing and managing optical shuffling is implemented through lens arrays that can be used to collimate and deflect optical signals for free space transfer into a second lens and connector assembly. Lens arrays may be expensive and limited in function in that, under certain circumstances, they might not implement complex shuffling. Further, lenses may result in a bulk design and may introduce optical losses.

The process of designing and building a shuffling system may be costly. Further, in at least some cases, designing and building may not be amenable to automation. Last but not least, a shuffling system can also be large and consume valuable space. In many systems, e.g., inside a computer or switch cabinet, space may be at a premium.

Various examples herein are to shuffle a plurality of optical beams such that light from a respective one of the plurality of sources is reflected and directed toward a respective one of the plurality of receivers. Examples herein implement such a shuffling using a sub-wavelength grating (SWG) section configured to reflect the light. Reflecting SWG sections facilitate flexibility at the time of implementing shuffling without compromising costs and/or space. Further, reflecting SWG sections facilitate performing shuffling in which sources and receivers are at the same side of the shuffling system, as illustrated in the examples further below.

A SWG refers to a grating that includes a diffraction grating with a pitch that is sufficiently small to suppress all but the 0th order diffraction. In contrast thereto, conventional wavelength diffraction gratings are characterized by a pitch that is sufficiently high to induce higher order diffraction of incident light. In other words, conventional wavelength diffraction gratings split and diffract light into several beams travelling in different directions. How an SWG section modifies an incident beam and its optical path may be determined at manufacturing by properly selecting the physical parameters of the SWG and, more specifically, the dimensions of its diffractive elements (e.g., ridge widths, ridge thicknesses, and ridge period spacings).

As detailed below in Section CONFIGURING SUB-WAVELENGTH GRATINGS, a SWG section may be arranged to control a wavefront incident thereon in a predefined manner. More specifically, gratings with a non-periodic, sub-wavelength pattern may be configured to impart an arbitrary phase front on the impinging beam. Thereby, an arbitrary diffractive or refractive element may be realized. Wavefront control with a SWG may be realized in devices described herein by including one or more SWG layers to perform particular wavefront control functions.

SWG sections may be configured to deflect an incident wavefront so as to change its travel direction. In particular, a SWG may be configured to reflect incident light with a specific outgoing wavefront shape. An SWG may be configured to transmit an incident light with a specific outgoing wavefront shape. Further functions that can be implemented with a SWG include splitting an incident wavefront into spectral components, or to filter specific spectral components of an incident wavefront. Furthermore, such SWG layers for wavefront control may be combined with SWG layers configured to collimate, focus, or expand the controlled wavefront.

In the following description, the term "light" refers to electromagnetic radiation with wavelength(s) in the visible and non-visible portions of the electromagnetic spectrum, including infrared and ultra-violet portions of the electromagnetic spectrum. The term "wavefront" refers to the locus (i.e., a line or, in a wave propagating in three dimensions, a surface) of points in a light beam having the same phase. The term "stack" refers to an ordered heap of SWG layers. Spacers may be interposed between the SGW layers of a stack. It will be understood that when a layer or film is referred to or shown as being "between" two layers or films, it can be the only layer or film between the two layers or films, or one or more intervening layers or films may also be present.

Shuffle Systems:

The optical shuffle systems described in the following are provided to illustrate some examples of a vast variety of possible arrangements for shuffling a plurality of optical beams in which at least one of the plurality of SWG sections is to reflect and direct one of the a plurality of beam toward a specific direction. However, it will be understood that optical shuffle systems are contemplated that are not limited to the specific shuffling architectures illustrated in examples herein. Optical shuffle systems are contemplated with any shuffling architecture suitable for a specific optical connection application.

FIG. 1 shows a perspective view of an environment in which an example of an optical shuffle system 100 to shuffle a plurality of beams 102a to 102d is illustrated (each individual beam is illustrated by a characteristic line pattern). System 100 includes sources 104a-104d to output respective beams of light 102a-102d. Sources 104a to 104d are optically coupled to input waveguides 106a-106d to output into system 100 the optical signals (not shown) carried by the waveguides.

System 100 further includes a plurality of receivers 108a-108d to receive respective beams of light. Receivers 108a-108d are spaced apart from sources 104a-104d. Receivers 108a-108d are optically coupled to output waveguides 110a to 110d to input the optical signals (not shown) carried by input waveguides 106a-106d into output waveguides 110a-110d.

System 100 further includes a shuffling assembly 112. Shuffling assembly 112 includes SWG sections 112a-112d. SWG sections 112a-112d are configured to define optical paths of beams 102a-102d.

According to at least some examples disclosed herein, a shuffle system includes a SWG section configured to reflect the light. In the specific example illustrated in FIG. 1, SWG sections 112b and 112d are reflecting SWG sections that, in operation of system 100, reflect and direct light from respective ones of sources 106b, 106d toward respective ones of receivers. 108b, 108c.

According to at least some examples disclosed herein, a shuffle system may include at least one transmissive SWG section to transmit light towards a specific direction. In the specific example illustrated in FIG. 1, SWG sections 112a and 112c are transmissive SWG sections that, in operation of system 100, transmit light from respective ones of sources 106a, 106c toward respective ones of receivers 108a, 108c.

Although not shown in FIG. 1, it will be understood that system 100 may further include elements for mechanically supporting and positioning the elements mentioned above. More specifically, system 100 may include a case enclosing the depicted elements and supporting the depicted elements through a plurality of mechanical links.

The term "source" refers to a portion of a shuffle system configured to be optically coupled to an input waveguide (e.g., any of input waveguides 106a to 106d) or any other element configured to output light into the source such as, for example, optical engines (e.g. a vertical-cavity surface-emitting laser). The term "receiver" refers to a portion of a shuffle system configured to receive light from a source. Generally, a receiver is to be optically coupled to an output waveguide (e.g., any of output waveguides 110a to 110d). Sources and receivers may be comprised of an opening or transparent material that, in operation, is optically aligned with, respectively, inputs and output elements for transmission of light. Sources and receivers may include optical elements such as lenses or SWG portions for modifying the wavefront of the light transmitted therethrough. More specifically, these optical elements may collimate, focus, or deflect light transmitted therethrough.

As used herein, a waveguide refers to an optical element configured to carry a light signal. Waveguides include, but are not limited to, optical fibers, dielectric slab waveguide, strip waveguides, or rib waveguides. A dielectric slag waveguide may be comprised of three layers of materials with different dielectric constants, the material being chosen such that light is confined in the middle layer by total internal reflection. A strip waveguide may be comprised of a strip of a light guiding layer confined between cladding layers. In a rib waveguide, the light guiding layer is comprised of a slab with a strip (or several strips) superimposed onto it.

As described in greater detail herein below, SWG sections may have various physical parameters (for instance, ridge spacings, ridge widths, ridge thicknesses, etc) selected to cause a specific variation of the phase shift in light impinging thereon. More specifically, these physical parameters may be selected in a manner such that the particular SWG section contributes to the shuffling in a pre-determined manner.

SWG Patterns may be designed to cause light to be reflected in a predetermined spatial mode at a specific SWG section (e.g., SWG sections 112b, 112d). In at least some examples herein, a reflecting SWG section is formed of a plurality of ridges having ridge widths, ridge thicknesses, and ridge period spacings selected to control phase changes in different portions of a beam of light so that the beam of light is reflected by the reflecting SWG section in a specific direction, as further detailed below in the next sections.

SWG Patterns may also be designed to cause light to be transmitted in predetermined spatial modes across a specific SWG section and directed by the specific SWG section (e.g., SWG sections 112a, 112c). In at least some examples herein, a transmitting SWG section is formed of a plurality of ridges having ridge widths, ridge thicknesses, and ridge period spacings selected to control phase changes in different portions of a beam of light so that the beam of light is transmitted through the transmitting SWG section towards a specific direction, as further detailed below in the next sections.

As can be understood from FIG. 1, different SWG sections of the SWG assembly may be configured to modify the optical path of incoming light beams in different manners in order to implement shuffling. In at least some examples herein, at least two of a plurality of SWG sections in a shuffling assembly has different ridge widths, ridge thicknesses, or ridge period spacings with respect to each other to direct beams of light into different directions with respect to each other. Although SWG sections 112-a-112d are shown in FIG. 1 as being discretely formed in assembly 112, it will be understood that two or more SWG sections may be formed continuously on a SWG assembly as described herein, each SWG section implementing a different shuffling function (e.g., one for reflecting light, another for transmitting light).

According to some examples, an optical shuffle system may form part of a multi-fiber optical shuffle system. For example, referring to the example in FIG. 1, at least one of channels 106a-106d, channels 110a and 110c, or channels 110b and 110d may respectively constitute individual fibers in three different multi-fiber connectors. For example, shuffle system 100 may implement shuffling between an input multi-fiber (with channels 106a-106d) and two output multi-fibers: a first output multi-fiber (with channels 110a and 110c) and a second output multi-fiber (with channels 110b and 110d).

Figure 2:
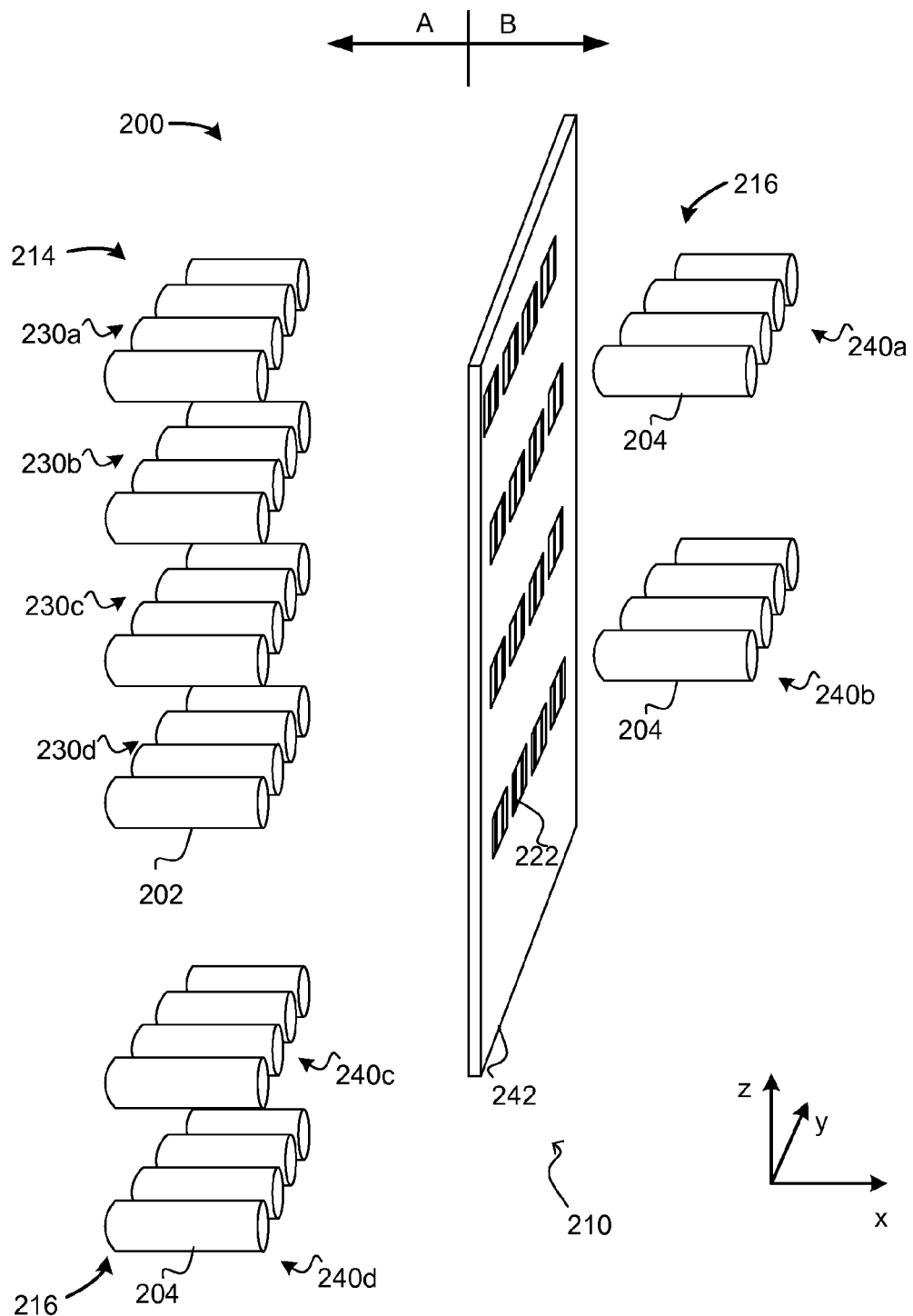
FIG. 2 schematically shows an isometric view of an optical shuffle system according to another example.

As can be appreciated from FIG. 2, an optical shuffle system according to examples herein may implement multi-dimensional shuffling. In other words, sources and receivers must not be co-planar. FIG. 2 shows an isometric view of an optical shuffle system 200, according to an example. Shuffle system 200 includes a plurality of sources 202 and a plurality of receivers 204, which are in a spaced relationship with respect to each other. Shuffle system 200 also includes a shuffling assembly 210 positioned between sources 202 and receivers 204.

A plurality of SWG sections 222 are depicted as being formed at shuffling assembly 210. Although not shown, shuffling assembly 210 may be maintained at substantially fixed locations with respect to sources 202 and the receivers 204 through use of any suitable mechanical supports. Shuffling assembly 210 may be connected to an actuator (not shown) that is to vary the position of shuffling assembly 210 with respect to sources 202 and receivers 204. Actuators for varying the position of a shuffling assembly are illustrated below with respect to FIG. 5D.

Sources 202 are depicted as being arranged in a plurality of source clusters 230a-230d and receivers 204 are depicted as being arranged in a plurality of receiver clusters 240a-240d. According to an example, sources 202 contained in a particular source cluster include the sources for a particular device (not shown) and receivers 204 contained in a particular receiver cluster 240 comprise receivers for another particular device (not shown). Receiver clusters 240c and 240d are placed at the same side (side A) as source clusters 230a-230d.

As can be appreciated from FIG. 2, shuffling assembly 210 includes a substantially planar sheet 242 of material in which SWG sections 222 are formed arranged in a two-dimensional array. Planar sheet 242 may be conveniently fabricated using lithographic techniques as further detailed below. It will be understood that sheet 242 is substantially planar in that planarity thereof is limited to the manufacturing tolerances of the specific technique used in its fabrication. At least some of SWG sections 222 are configured as reflecting SWG to facilitate shuffling between sources and receivers at the same side of shuffle assembly 200 and, more specifically, between source clusters 230a-230d and receiver clusters 240c and 240d.

Figure 3:
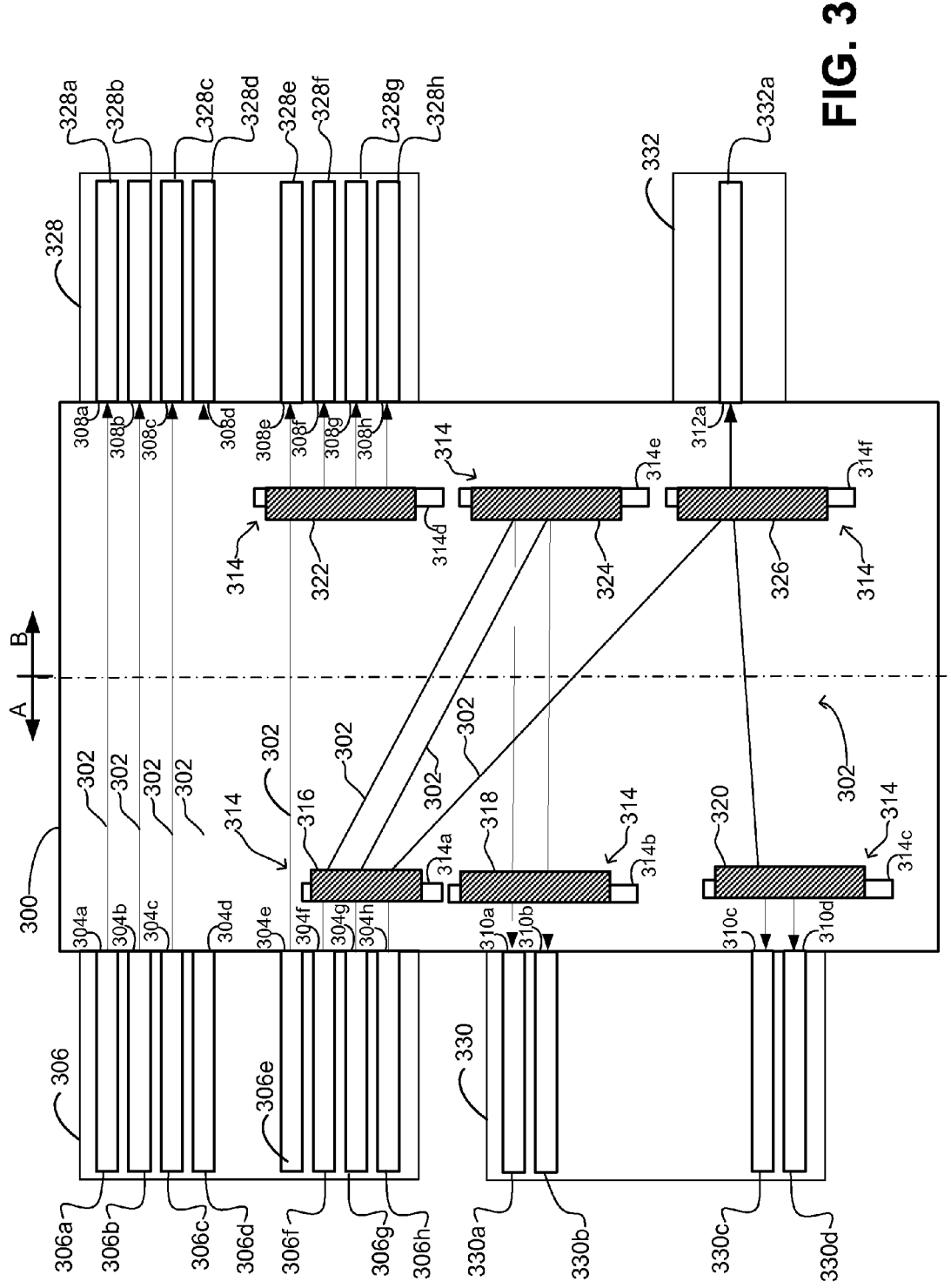
FIG. 3 schematically shows a perspective view of an environment including another example of an optical shuffle system.

A further example of a shuffle system to shuffle between source and receivers is illustrated with respect to FIG. 3. FIG. 3 illustrates how a SWG assembly may compactly implement a variety of shuffling functions. FIG. 3 illustrates an environment in which an optical shuffle system 300 is included. Shuffle system 300 is to shuffle a set of optical beams 302. Shuffle system 300 includes sources 304a-304h, receivers 308a-308h, 310a-310d, 312a, and a shuffling assembly 314 comprised of shuffling elements 314a-314f. Each of the shuffling elements include SWG sections 316, 318, 320, 322, 324, 326 configured to implement shuffling between the sources and the receivers.

As can be appreciated in the figure, a portion of a plurality of SWG sections may be disposed at a first side of an optical shuffle system and another portion of the plurality of SWG sections may be disposed at a second side of the optical shuffle system. The second side is opposite to the first side. In the specific example of FIG. 3, SWG sections 316, 318, and 320 are at side A of system 300 and SWG sections 322, 324, 326 are at side B of system 300. As can be understood from the description below, placing SWG sections at opposite sides facilitates a diversity of shuffling functions. Moreover, combining placement on opposite sides and reflecting SWG further facilitates performing shuffling in which sources and receivers are at the same side of the shuffling system.

Shuffle system 302 is to couple the optical signals from channels 306a-306h from an input connector 306 into the channels of output connectors 328, 330, and 332 according to a specific shuffling pattern. Channels 306a-306h of input connector 306 are to carry individual optical signals. Beams 302 carrying these optical signals are outputted from the channels of input connector through sources 304a-304h into shuffle system 300.

As illustrated in the Figure, shuffle system 300 directly couples light signals from sources 304a-304d into receivers 308a-308d. Receivers 308a-308d couple these optical signals into channels 328a-328d of connector 328.

Shuffle system 302 is further to broadcast the optical signal from channel 306e into channels 328e-328h. As illustrated in the Figure, SWG section 322 at a shuffling element 314d is configured to split an impinging light beam into four different beams. SWG section 322 is optically aligned with source 304e and receivers 308e-308h to implement this broadcast function of shuffling system 300. Receivers 308e-308h couple the optical signal into channels 328e-328h of connector 328.

Shuffle system 302 is further to couple the optical signals from channels 306f and 306g at connector 306 into, respectively, channels 330a and 330b at connector 330. Connectors 306 and 330 are at the same side (side A) of shuffle system 300. Shuffle of these optical signals is implemented by a cooperation of three different SWG sections: the optical beams emitted from sources 304f and 304g are deflected by SWG section 316 at a SWG element 314a towards SWG section 324 at a SWG element 314e; SWG section 316 reflects the optical beam from SWG section 316 towards SWG section 318 at a SWG element 314b; SWG section 318 collimates the optical beams from SWG section 324 into receivers 310a, 310b. Receivers 310a-310b couple the optical signal into channels 330a and 330b at connector 330.

Shuffle system 302 is further to broadcast the optical signal from channel 306h at connector 306 into channels 330c and 330d at connector 330 and channel 332a at connector 332. Connectors 330 and 332 are at opposite sides of shuffle system 300. Shuffle of the optical signals is implemented by a cooperation of three different SWG sections: the optical beam emitted from source 304h is deflected by SWG section 316 at SWG element 314a towards SWG section 326 at SWG element 314f; SWG section 316 reflects a portion of the optical beam from SWG section 316 towards SWG section 320 at SWG element 314c and transmits and collimates another portion of the optical beam into receiver 312a; SWG section 320 splits the optical beam from SWG section 326 into two individual beams that are collimated into receivers 310c, 310c. Receiver 312a couples the optical signal into channel 332a, and receivers 310c-310d couple the optical signal into channels 330c and 330d at connector 330.

In some examples herein, a shuffling assembly includes (i) a first substantially planar sheet of material in which at least a first portion of a plurality of SWG sections is formed arranged in a two-dimensional array, and (ii) a second substantially planar sheet of material in which at least a second portion of the plurality of SWG sections is formed also arranged in a two-dimensional array. These examples are illustrated with respect to FIG. 4.

Figure 4:
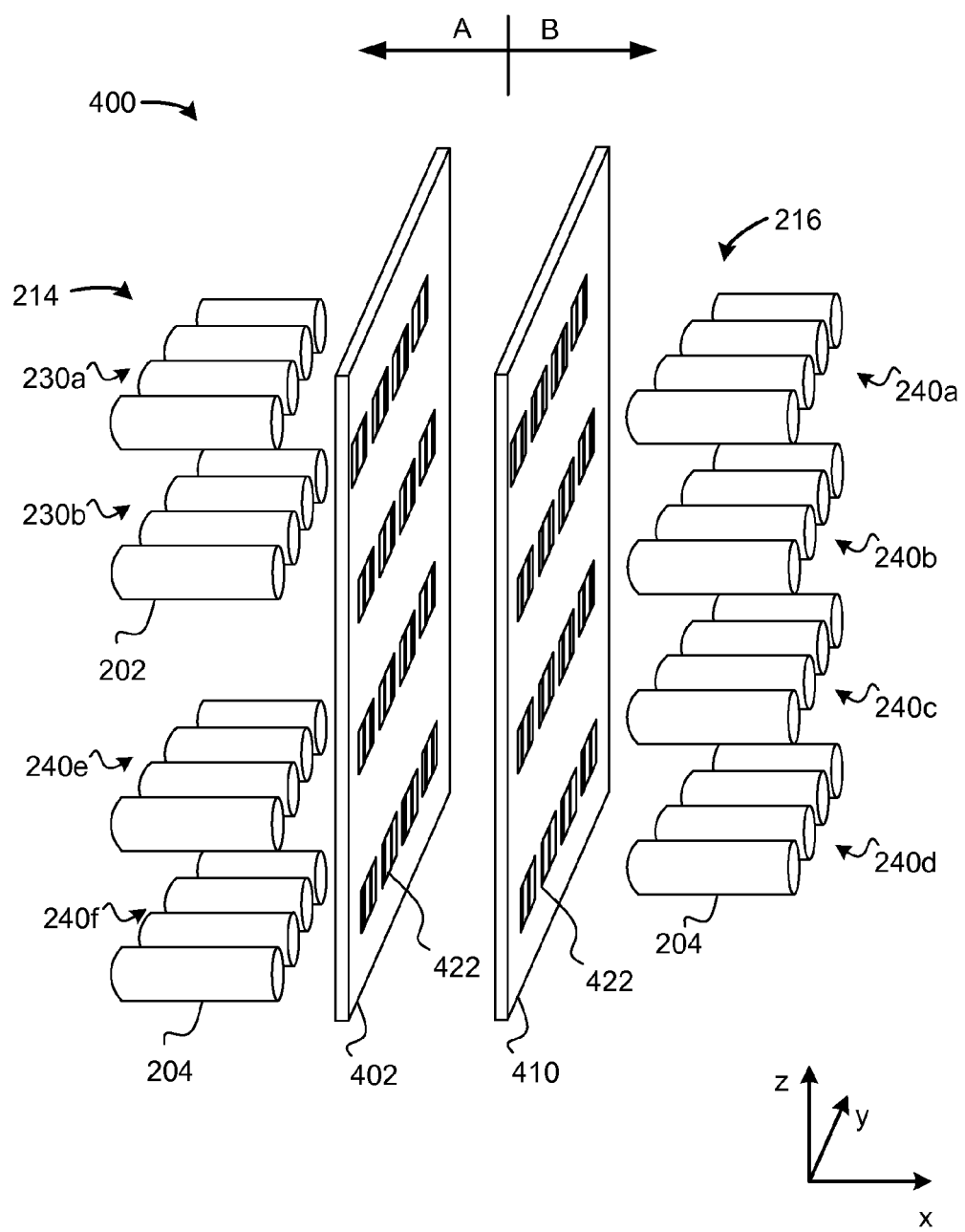
FIG. 4 schematically shows an isometric view of an optical shuffle system according to another example.

FIG. 4 shows an isometric view of an optical shuffle system 400 according to another example. Shuffle system 400 includes sources 202, arranged in a plurality of source clusters 230a-230b, and receivers 204, arranged in a plurality of receiver clusters 240a-240f (these elements are illustrated above with respect to FIG. 2). Receiver clusters 240e-240f are arranged at the same side (side A) of shuffle system 400 as source clusters 230a-230b.

Shuffle system 400 further includes a first substantially planar sheet 402 of material in which a first portion of a plurality of SWG sections 422 is formed arranged in a two-dimensional array. In the illustrated example, the first portion of SWG sections 422 is configured as transmitting SWG sections to transmit optical signals emitted from source clusters 230a-230b towards a second portion of SWGs or to couple optical signals into receiver clusters 240e-240f. SWGs of the second portion of SWG sections 422 may implement other optical functions such as focusing, deflection, or collimation in order to implement a particular shuffling scheme.

Shuffle system 400 further includes a second substantially planar sheet of material 410 in which a second portion of the plurality of SWG sections 422 is formed arranged in a two-dimensional array. At least some of SWG sections 422 are configured as reflecting SWG to facilitate shuffling between sources and receivers at the same side of shuffle assembly 400 and, more specifically, between source clusters 230a-230d and receiver clusters 240e and 240f. Another portion of SWG sections 222 may be configured as transmitting SWGs or for implementing some other optical functions such as focusing, deflection, or collimation in order to implement a particular shuffling scheme.

Although SWG sections 222, 422 have been depicted as being formed in discreet locations on the respective planar sheets 210, 410, it should be understood that additional sections of the planer sheets may be formed of SWG sections without departing from a scope of a optical shuffle system as disclosed herein. Thus, for instance, substantially the entire surface area, for instance, greater than about 75% of the surface area, of a planar sheet may include SWGs.

Figure 5A:
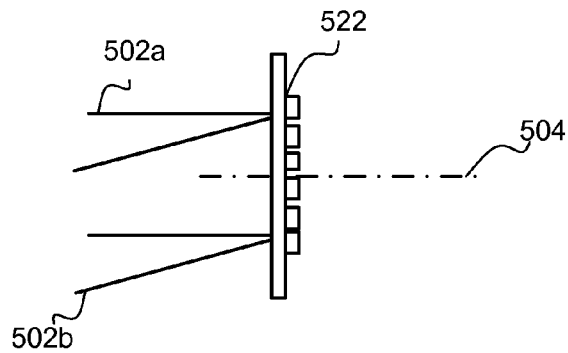
FIG. 5A schematically shows a diagram of beams of light that are reflected by a SWG section according to examples.

FIG. 5A shows an example of a manner in which a SWG section 522 reflects a beam of light 502a propagating along an axis 504 of SWG section 522 into a beam of light 502b off from axis 504.

Figure 5B:
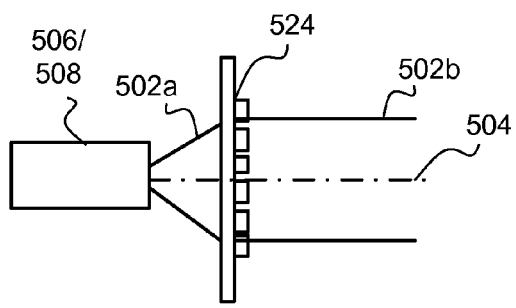
FIGS. 5B and 5C schematically shows diagrams of beams of light that are transmitted through SWG sections according to examples.

FIG. 5B shows an example of a manner in which, when viewed from left to right, a SWG section 524 collimates a beam of light 502a from a receiver 506 into beam of light 502b along an axis 504 of SWG section 524. Similarly, the diagram depicted in FIG. 5B, when viewed from right to left, also depicts an example in which SWG section 524 focuses beam of light 502b into a receiver 508 along axis 504.

Figure 5C:
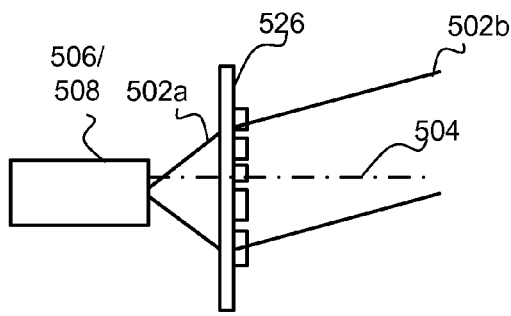

FIG. 5C shows an example of a manner in which, when viewed from left to right, a SWG section 526 collimates a beam of light 502a from a source 506 into beam 502b and changes its direction such that beam 502b is off from axis 504 of SWG section 112. Similarly, the diagram depicted in FIG. 5C, when viewed from right to left, depicts an example in which SWG section 526 focuses beam of light 502b into beam 502a and changes its direction such that beam 502a propagates along axis 504 and onto a receiver 508.

Figure 5D:
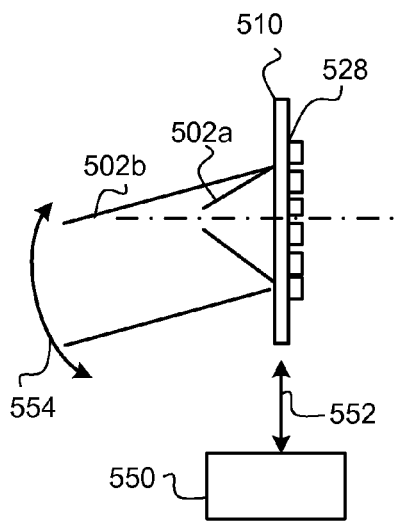
FIG. 5D schematically shows a diagram of a manner in which the direction of a beam of light is varied according to examples.

According to at least some examples herein, at least a portion of the plurality of SWG sections is movable relative to the sources for varying respective optical paths of the plurality of beams. Referring to FIG. 5D, an SWG assembly 510, including a reflecting SWG section 528, may be attached to an actuator 550 to move SWG assembly 510 in one or more specific directions, as denoted by arrow 552. SWG section 528 is to reflect an incoming diverging beam 502a into a collimated beam 502b propagating in a specific direction. Movement of SWG assembly 510 generally causes the direction of reflected beam of light 502b to vary, as denoted by arrow 554. As such, beam of light 502b as depicted in FIG. 5D may move in either or both of the directions indicated by the arrows 552, 554 to thereby cause a light signal carried by beam of light 132a to be coupled into different ones of the receivers 104 in the shuffling system. Analogously, an actuator may be attached to an SWG assembly including a transmitting SWG section to control in which receiver a beam transmitted through the SWG section couples. Actuator 550 may comprise, for instance, an encoder, a micro-electromechanical system (MEMS) or any other element suitable for actuating SWG assembly 510.

According to some examples, the beams of light emitted from a plurality of sources may be directed to a first subset of the plurality of receivers when movable SWG sections are in a first position and wherein the beams of light from the plurality of sources are directed to a second subset of the plurality of receivers when the movable SWG sections are in a second position For example, referring to the examples illustrated with respect to FIGS. 1 to 4, any of elements 112, 210, 314, 402, 410 may be movable (e.g. through an actuator as depicted in FIG. 5D) to vary the shuffling functions implemented by the respective assemblies. When the relative position of one or more SWG sections and sources, different sets of the SWG sections will be positioned in the optical paths of the beams of light. Further, the different sets of SWG sections may have different physical characteristics, thus causing that the optical path of the beams of light are modified, so that the beams are directed into different specific directions. Therefore, movable SWG sections facilitate that different receivers may receive light beams from different sources by actuation. Alternatively, however, this may be accomplished by replacing an SWG assembly with another SWG assembly having SWG sections with different physical characteristics from those of the replaced SWG assembly.

Figure 6:
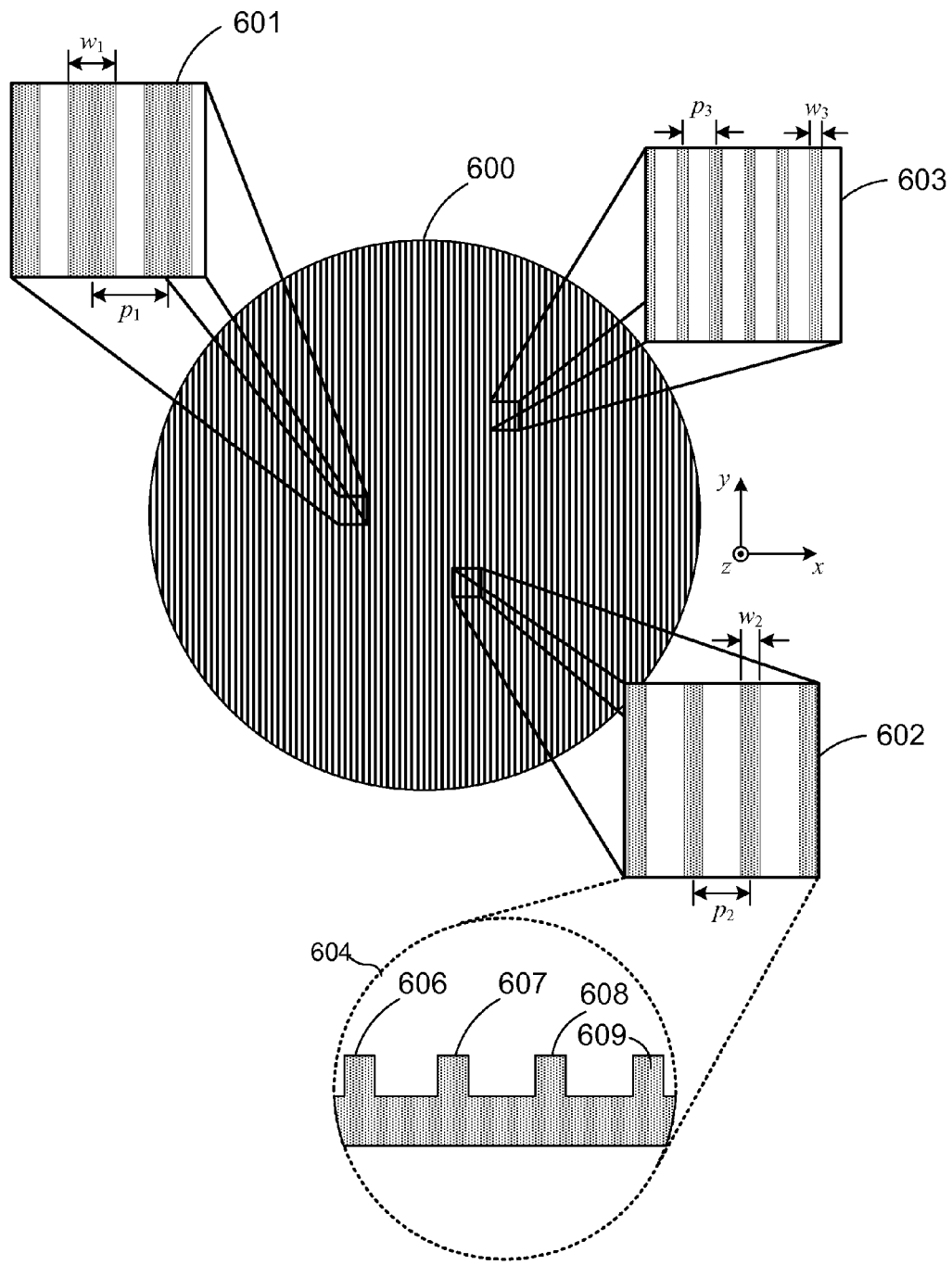
FIG. 6 schematically shows a top plane view of a SWG assembly according to examples.

Configuring Sub-Wavelength Gratings:

FIG. 6 shows a top plane view of a SWG assembly 600 configured with a SWG section including a grating pattern according to an example. In this example, SWG assembly 600 includes a number of one-dimensional grating sub-patterns. Three grating subpatterns 601-603 are depicted enlarged. Each grating sub-pattern includes a number of regularly arranged diffractive structures. In the depicted example, the diffractive structure is illustrated as spaced wire-like portions of SWG layer material (hereinafter referred to as "lines"). The lines extend in the y-direction and are spaced in the x-direction. An enlarged end-on view 604 of grating sub-pattern 602 is also depicted. As illustrated by end-on view 604, SWG layer 600 may be a single layer with lines, such as lines 606-609, separated by grooves formed in the layer.

It will be understood that the diffractive structures in a SWG section are not limited to to one-dimensional gratings as illustrated with respect to FIG. 6. An SWG section may be configured with a two-dimensional non-periodical SWG so that the SWG layer can be operated to implement a specific wavefront control function or other optical functions such as focusing, expanding, reflection, collimating an incident beam, or combinations thereof. In examples, a non-periodical SWG is composed of posts instead lines, the posts being separated by grooves. The duty cycle and period can be varied in the x- and y-directions by varying the post size. In other examples, a non-periodical SWG layer is composed of holes separated by solid portions. The duty cycle and period can be varied in the x- and y-directions by varying the hole size. Such post or holes may be arranged according to a variety of shapes such as a circular or rectangular shape. Examples of further geometrical dispositions are illustrated in the references mentioned herein and incorporated by reference.

A sub-pattern of a SWG layer is characterized by one or more periodic dimensions characteristic of the diffractive structure. In the example of FIG. 6, the periodic dimensions correspond to (a) the spacing of the lines, and (b) the line width in the x-direction. More specifically, sub-pattern 601 comprises lines of width $w_1$ periodically spaced with a period $p_1$; sub-pattern 602 comprises lines with width $w_2$ periodically spaced with a period $p_2$, and the sub-pattern 603 comprises lines with width $w_3$ periodically spaced with a period $p_3$. A grating sub-patterns form a sub-wavelength grating if a characteristic dimension thereof (e.g., periods $p_1$, $p_2$, or $p_3$) is smaller than the wavelength of the particular incident light for which it is designed to operate. For example, a characteristic dimension of a SWG (e.g., periods $p_1$, $p_2$, or $p_3$) can range from approximately 10 nm to approximately 300 nm or from approximately 20 nm to approximately 1 μm. Generally, the characteristic dimensions of a SWG are chosen depending on the wavelength of the light for which a particular wavefront control device is designed to operate.

$0^{th}$ order diffracted light from a sub-region acquires a phase φ determined by the line thickness t, and the duty cycle η, which is defined by:

$$\eta = \frac{w}{p},$$

where w is the line width and p is the period of the lines associated with the region.

Each of the grating sub-patterns 601-603 diffract incident light differently due to the different duty cycles and periods associated with each of the sub-patterns. SWG section 600 may be configured to interface incident light in a specific manner by adjusting the period, line width, and line thickness of the lines.

Figure 7:
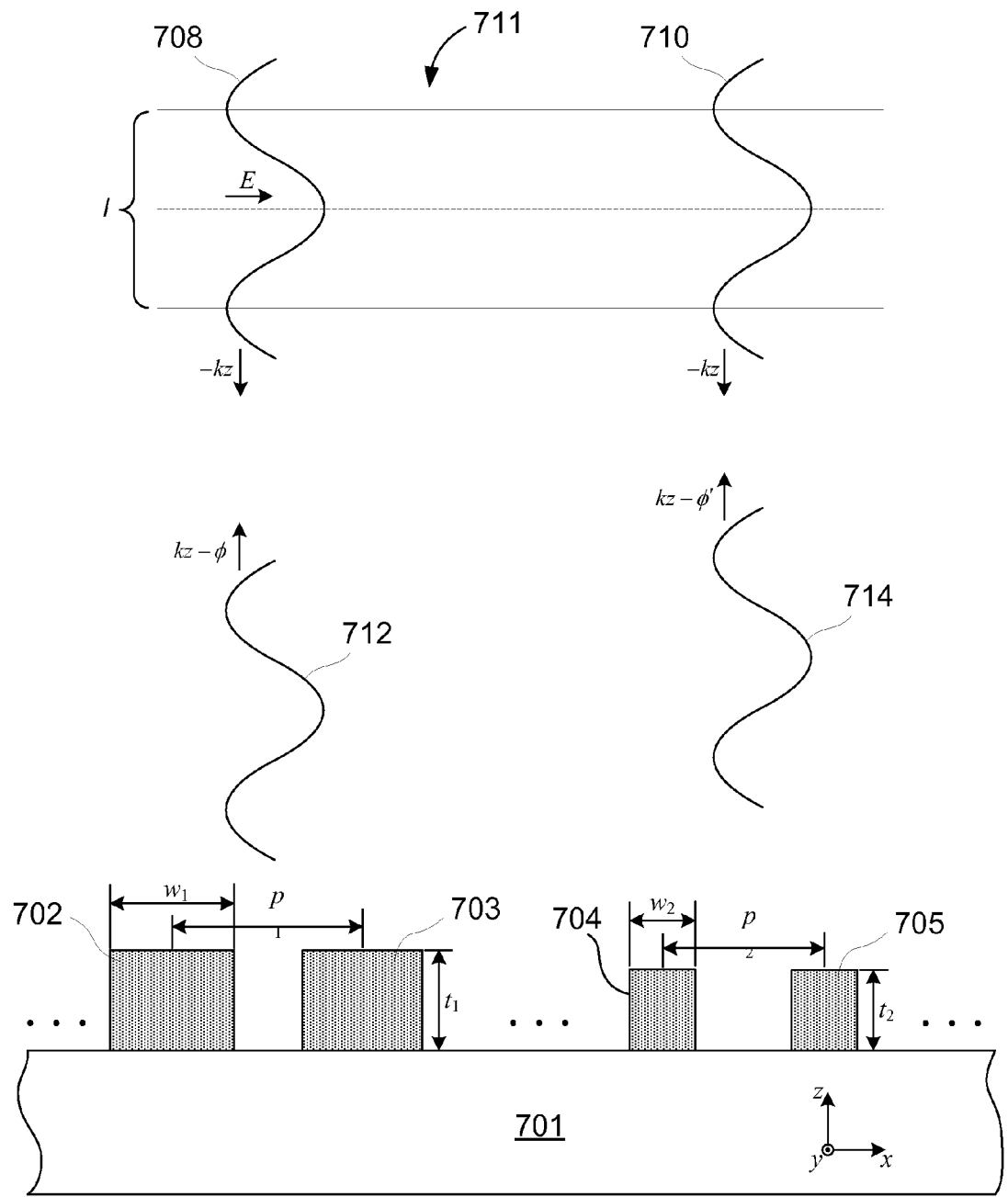
FIG. 7 schematically shows two separate grating sub-patterns in operation according to examples.

FIG. 7 shows a cross-sectional view of lines from two separate grating sub-patterns revealing the phase acquired by reflected light in accordance with examples. The gratings are disposed onto a substrate 701. Lines 702 and 703 can be lines in a first sub-pattern and lines 704 and 705 can be lines in a second sub-pattern located elsewhere on the substrate 701. The thickness $t_1$ of the lines 702 and 703 is greater than the thickness $t_2$ of the lines 704 and 705, and the duty cycle $\eta_1$ associated with the lines 702 and 703 is also greater than the duty cycle $\eta_2$ associated with the lines 704 and 705. Light polarized in the x-direction and incident on the lines 702-705 becomes trapped by the lines 702 and 703 for a relatively longer period of time than the portion of the incident light trapped by the lines 704 and 705. As a result, the portion of light reflected from the lines 702 and 703 acquires a larger phase shift than the portion of light reflected from the lines 704 and 705. As shown in the example of FIG. 7, the incident waves 708 and 710 strike the lines 702-705 with approximately the same phase, but the wave 712 reflected from the lines 702 and 703 acquires a relatively larger phase shift than the phase acquired by the wave 714 reflected from the lines 704 and 705.

Figure 8:
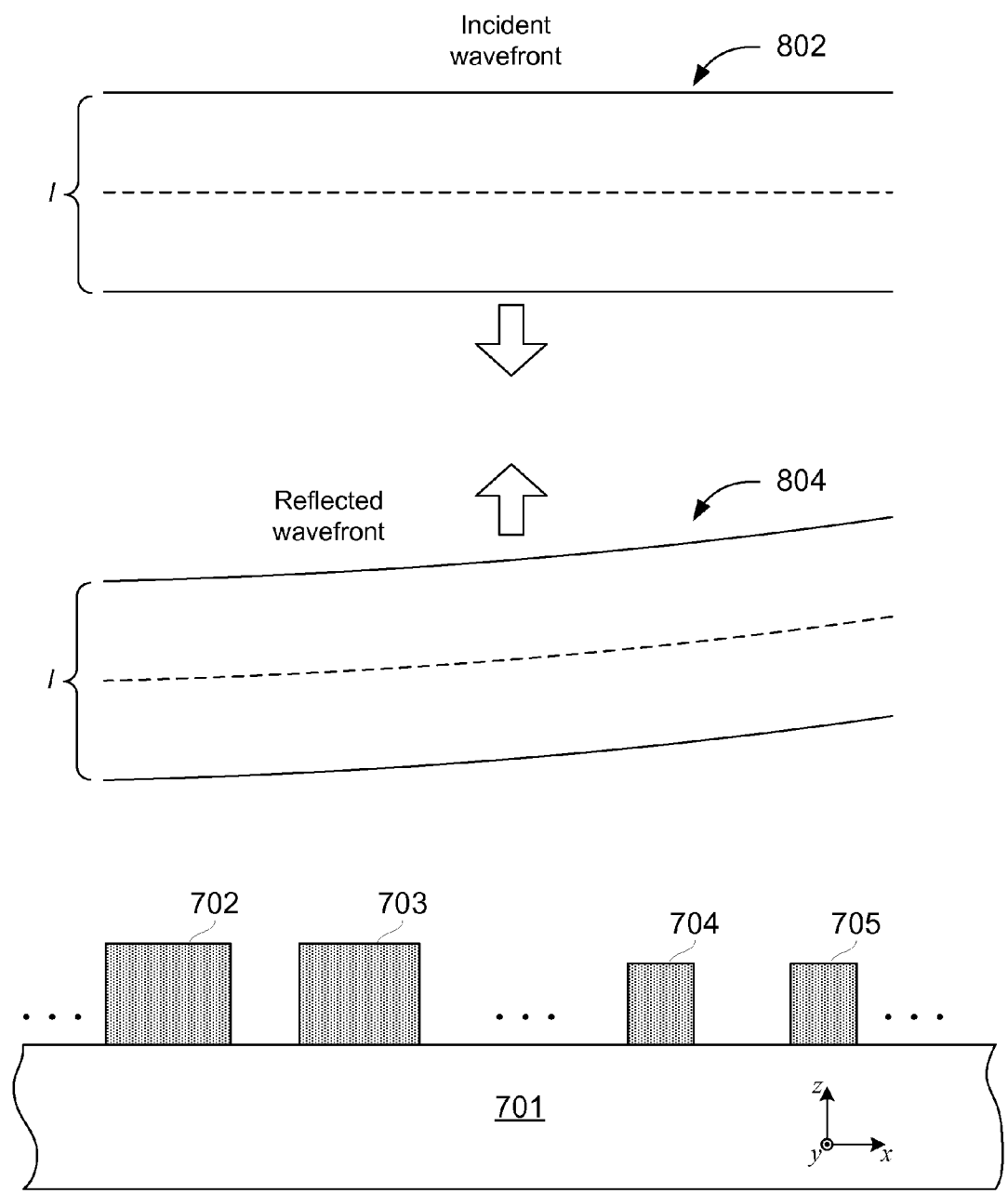
FIG. 8 schematically shows two separate grating sub-patterns in operation according to examples.

FIG. 8 shows a cross-sectional view of the lines 702-705 revealing how the wavefront changes in accordance with examples of the present invention. As shown in the example of FIG. 8, incident light with a substantially uniform wavefront 802 strikes lines 702-705 and substrate 701 producing reflected light with a curved reflected wavefront 804. The curved reflected wavefront 804 results from portions of incident wavefront 802 interacting with lines 702 and 703 with a relatively larger duty cycle $\eta_1$ and thickness $t_1$ than portions of the same incident wavefront 802 interacting with the lines 704 and 705 with a relatively smaller duty cycle $\eta_2$ and thickness $t_2$. The shape of the reflected wavefront 804 is consistent with the larger phase acquired by light striking the lines 702 and 703 relative to the smaller phase acquired by light striking the lines 704 and 705.

A SWG section can be configured to apply a particular phase change to reflected light while maintaining a very high reflectivity. In particular, a SWG configured with a one-dimensional grating pattern can apply a phase change to reflected light polarized perpendicular to the lines, as described above with reference to FIGS. 7 and 8.

Figure 9A:
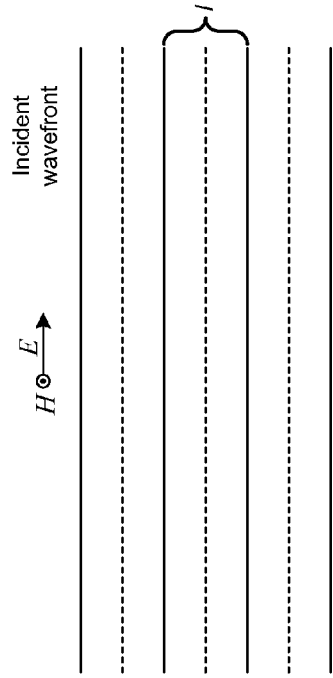
FIGS. 9A and 9B schematically show a side view of SWG sections in operation.
Figure 9A:
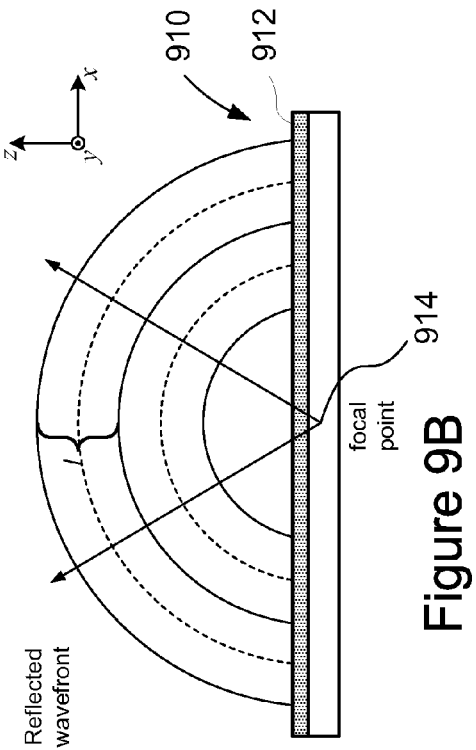
Figure 9B:
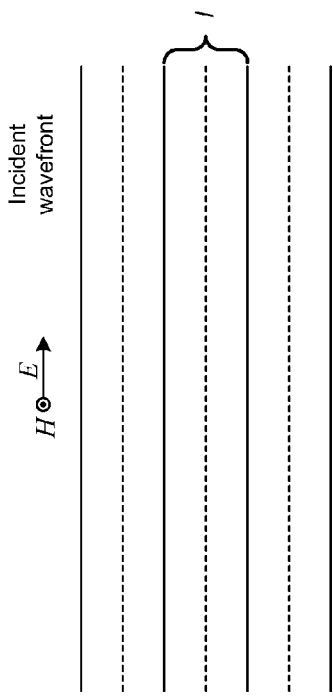
Figure 9B:
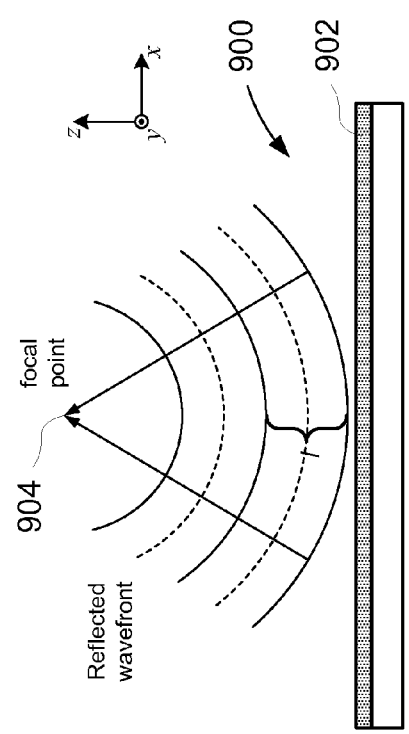

FIG. 9A shows a side view of a SWG section 900 with a grating layer 902 configured to focus incident light to a focal point 904 in accordance with examples of the present invention. In the example of FIG. 9A, the grating layer 902 is configured with a grating pattern so that incident light polarized in the x-direction is reflected with a wavefront corresponding to focusing the reflected light at the focal point 904. On the other hand, FIG. 9B shows a side view of a SWG section 910 with a grating layer 912 configured and operated as a diverging mirror in accordance with examples of the present invention. In the example of FIG. 9B, the grating layer 912 is configured with a grating pattern so that incident light polarized in the x-direction is reflected with a wavefront corresponding to light emanating from a focal point 914.

FIGS. 7 to 9B illustrate reflection of a wavefront by a SWG section. Alternatively, or in combination therewith, a SWG section may be configured to transmit a wavefront. A SWG section may be provided with reflecting SWG layers disposed parallel so as to form resonant cavities. Light may then become trapped on these resonant cavities. The resonant cavities are then configured so that light becomes ultimately transmitted through the reflection layers with different phases in the beam. More specifically, the dimensions of diffractive elements in the SWG layers may be chosen such that the transmission characteristics of sub-patterns of the grating are comprised between resonances in the transmission curves so that a SWG is insensitive to polarization of an incident wavefront. In an example, an unpolarized transmissive diffractive SWG section for 650 nm wavelength may be designed based on an array of 130 nm tall silicon posts with a fixed pitch of 475 nm and post diameters varying between 140 nm and 380 nm.

More specific examples of SWG sections for transmitting a wavefront are illustrated in the article "A Silicon Lens for Integrated Free-Space Optics," by Fattal et al. published in Integrated Photonics Research, Silicon and Nanophotonics, OSA Technical Digest (CD) (Optical Society of America, 2011), and the international application with publication number WO 2011/093893, which documents are incorporated herein by reference to the extent in which this document are not inconsistent with the present disclosure and in particular those parts thereof describing SWG designs for transmission of light.

Designing Optical Shuffle Systems:

Various examples of methods to fabricate and optical shuffle system are illustrated in the following. However, it will be understood that the present disclosure are not limited to these methods and that a variety of methods are available, in particular for the design of SWG sections.

Figure 10:
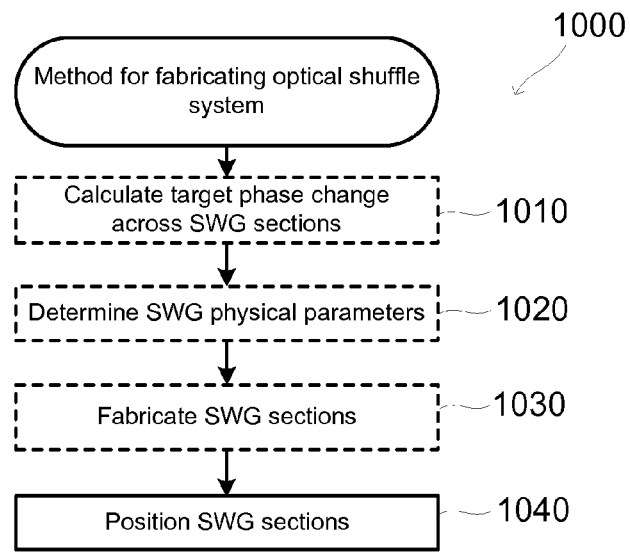
FIG. 10 shows a flow chart that illustrates examples of methods for fabricating optical shuffle systems.

FIG. 10 shows a flow chart 1000 that illustrates methods for fabricating optical shuffle systems. It should be understood that flow chart 1000 is a generalized illustration and that additional blocks may be added and/or existing blocks may be modified or removed without departing from the scope of the present disclosure.

At block 1010 a target phase change across each of a plurality of SWG sections may be calculated each of the target phase changes may correspond to a desired wavefront shape in a respective beam of light to be transmitted or reflected through the plurality of SWG sections. The SWG sections, when implemented in an operating shuffle system, cooperate to implement a specific shuffling.

This target phase change may be seen as specific phase changes induced by a SWG in transmitted or reflected light. Such target phase change may be calculated using transmittance or reflectance curves, which curves associate transmittance or reflectance of an impinging wavefront and a resulting phase shift over a range of incident light wavelengths for a specific SWG section. Calculated transmittance or reflectance curves may be used to uniformly adjust geometric parameters of an entire SWG section in order to produce a desired change in the transmitted wavefront. (Some examples of such curves are further illustrated below.)

At block 1020, SWG physical parameters are determined. More specifically, at block 1020, ridge widths, ridge period spacings, and ridge thicknesses corresponding to target phase changes, such as those calculated at block 1010, may be calculated for each of a plurality of SWG sections. In certain examples, block 1020 may include determining a duty cycle of portions of a SWG section. For performing this determination, a plot of transmittance or reflectance and phase shift as a function of a SWG duty cycle for light with a specific wavelength may be used. Further, SWG physical parameters may be determined by considering variations in the phase of light transmitted through a SWG section as a function of ridge period spacing and duty cycle of the SWG section. This function may be reflected in a contour plot of phase variation as a function of period and duty cycle. Contour ridges correspond to a particular phase acquired by light transmitted through a SWG section with a SWG layer configured with a period and duty cycle lying anywhere along the contour. Examples of determining SWG physical parameters are described in any of the patent documents cited herein and incorporated by reference also on this respect.

Some examples of transmittance and reflectance curves mentioned above are shown in international application with publication number WO2011/093893, which is incorporated herein, in particular those sections thereof describing calculation of target phase changes for reflecting SWG sections. Examples of such reflectance curves are shown in, for example, international application with publication number WO2011/129814, which is incorporated herein, in particular those sections thereof describing calculating target phase changes for transmitting SWG sections.

Transmittance and reflectance curves as well as contour plot of phase variation may be obtained using the application "MIT Electromagnetic Equation Propagation" ("MEEP") simulation package to model electromagnetic systems from COMSOL Multiphysics®. This package is a finite element analysis and solver software package that can be used to simulate various physics and engineering applications, or other suitable simulation application. It will be understood that there is a variety of methods for calculating target phase changes of SWG sections as described in any of the patent applications cited herein and incorporated by reference also on this respect.

At block 1030, SWG sections are fabricated to have the SWG physical parameters determined at block 1020 and, more specifically, determined ridge widths, ridge period spacings, and ridge thicknesses. It will be understood that there is a variety of methods for fabricating SWG sections. For instance, the ridges of the output SWG sections 112 and the input SWG sections 122 may be fabricated through use of lithographic techniques such as, reactive ion etching, focusing ion beam milling, nanoimprint lithography, etc. By way of a particular example, the ridges of respective SWG sections may be patterned directly on a first layer of material. As another example, an imprint mold on which the ridges are defined may be used to imprint the ridges into a first layer. Each of the SWG sections may be formed in a planar sheet of material (e.g., sheets 242, 402, or 410) during a single fabrication operation. In addition, each of the input SWG sections illustrated herein may be formed in a planar sheet of material during a single fabrication operation.

At block 1040, SWG sections (e.g., SWG sections fabricated at block 1030) are positioned for defining optical paths of a plurality of beams. At least one of the SWG sections is to reflect and direct one of the plurality of beams toward a specific direction (examples of reflecting SWG sections are illustrated above with respect to FIGS. 1 to 4). At least another of the plurality of SWG sections is to transmit one of the plurality of beams therethrough toward a specific direction (examples of transmitting SWG sections are illustrated above with respect to FIGS. 1 to 4).

Examples of specific positioning of SWG sections are illustrated above with respect to FIGS. 1 to 4. The positioning may be accomplished automatically, semi-automatically or manually. It will be understood that there is a variety of manners available to realize the positioning and it may involve the use of positioning elements such as, but not limited to, clamping elements, positioning slots, or holding elements.

Figure 11:
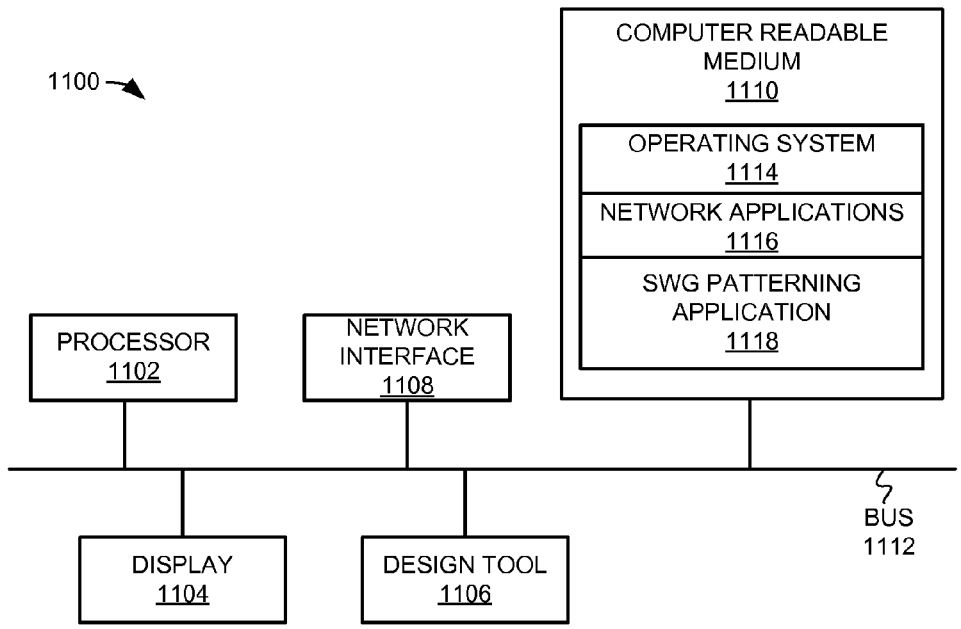
FIG. 11 shows a schematic representation of examples of a computing device, which may be employed to perform some of the operations in the method depicted in FIG. 10.

Turning now to FIG. 11, there is shown a schematic representation of a computing device 1100, which may be employed to perform various operations in flow chart 1000, according to an example. Device 1100 includes a processor 1102, such as a central processing unit; a display device 1104, such as a monitor; a design tool interface 1106; a network interface 1108, such as a Local Area Network LAN, a wireless 802.11x LAN, a 3G mobile WAN or a WiMax WAN; and a computer-readable medium 1110. Each of these components is operatively coupled to a bus 1112. For example, the bus 1412 may be an EISA, a PCI, a USB, a FireWire, a NuBus, or a PDS.

The computer readable medium 1110 may be any suitable medium that participates in providing instructions to the processor 1102 for execution. For example, the computer readable medium 1110 may be non-volatile media, such as an optical or a magnetic disk. The computer-readable medium 1110 may also store an operating system 1114, such as Mac OS, MS Windows, Unix, or Linux; network applications 1116; and a SWG pattering application 1118. The network applications 1116 includes various components for establishing and maintaining network connections, such as software for implementing communication protocols including TCP/IP, HTTP, Ethernet, USB, and FireWire.

SWG patterning application 1118 provides various machine readable instructions for calculating target phase changes and determining the ridge widths, ridge period spacings, and ridge thicknesses for SWG sections corresponding to the calculated target phase changes as discussed above with respect to the method 1000 in FIG. 10. In certain examples, some or all of the processes performed by the application 1118 may be integrated into the operating system 1114. In certain examples, the processes may be at least partially implemented in digital electronic circuitry, or in computer hardware, machine readable instructions (including firmware and software), or in any combination thereof, as also discussed above.

In the foregoing description, numerous details are set forth to provide an understanding of the examples disclosed herein. However, it will be understood that the examples may be practiced without these details. Further, it should be understood that the systems depicted herein may include additional components and that some of the components described herein may be removed and/or modified. While a limited number of examples have been disclosed, numerous modifications and variations therefrom are contemplated. It is intended that the appended claims cover such modifications and variations. Claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. A system for shuffling a plurality of optical beams comprising:
    a plurality of sources to output respective beams of light;
    a plurality of receivers to receive respective beams of light emitted from the plurality of sources;
    a shuffling assembly including a plurality of sub-wavelength grating (SWG) sections, each of the plurality of SWG sections being for defining optical paths of the plurality of beams;
    wherein the plurality of SWG sections includes at least one reflecting SWG section to reflect and direct light from a respective one of the plurality of sources toward a respective one of the plurality of receivers; and
    wherein the plurality of SWG sections implement different respective shuffling functions, and at least a portion of the plurality of SWG sections are formed together continuously as a substantially planar sheet.

2. The optical shuffle system according to claim 1, wherein the at least one reflecting SWG section is formed of a plurality of ridges having ridge widths, ridge thicknesses, and ridge period spacings selected to control phase changes in different portions of a beam of light so that the beam of light is reflected by the reflecting SWG section in a specific direction.

3. The optical shuffle system according to claim 2, wherein the plurality of SWG sections includes at least one transmissive SWG section formed of a plurality of ridges having ridge widths, ridge thicknesses, and ridge period spacings selected to control phase changes in different portions of a beam of light transmitted through the transmissive SWG section so that the beam of light is transmitted by the SWG section in a specific direction.

4. The optical shuffle system according to claim 1, wherein at least two of the plurality of SWG sections have different ridge widths, ridge thicknesses, or ridge period spacings with respect to each other to direct beams of light into different directions with respect to each other.

5. The optical shuffle system according to claim 1, wherein a portion of the plurality of SWG sections are disposed at a first side of the optical shuffle system and another portion of the plurality of SWG sections are disposed at a second side of the optical shuffle system, the second side being opposite to the first side.

6. The optical shuffle system according to claim 1, wherein the shuffling assembly includes a first substantially planar sheet of material in which at least a first portion of the plurality of SWG sections is formed arranged in a two-dimensional array.

7. The optical shuffle system according to claim 6, wherein the shuffling assembly includes a second substantially planar sheet of material in which at least a second portion of the plurality of SWG sections is formed arranged in a two-dimensional array.

8. The optical shuffle system according to claim 1, wherein at least a portion of the plurality of SWG sections is movable relative to the sources for varying respective optical path of the plurality of beams.

9. The optical shuffle system according to claim 8, wherein the beams of light emitted from the plurality of sources are directed to a first subset of the plurality of receivers when the movable SWG sections are in a first position and wherein the beams of light from the plurality of sources are directed to a second subset of the plurality of receivers when the movable SWG sections are in a second position.

10. The optical shuffle system according to claim 1, wherein the optical shuffle system forms part of a multi-fiber optical shuffle system.

11. A method for fabricating an optical shuffle system to shuffle a plurality of beams from a plurality of sources to a plurality of receivers, said method comprising:
    positioning a plurality of sub-wavelength grating (SWG) sections for defining optical paths of the plurality of beams, wherein
    the plurality of SWG sections implement different respective shuffling functions, and at least a portion of the plurality of SWG sections are formed together continuously as a substantially planar sheet;
    at least one of the plurality of SWG sections is to reflect and direct one of the plurality of beams toward a specific direction; and
    at least one of the plurality of SWG sections is to transmit one of the plurality of beams therethrough toward a specific direction.

12. The method according to claim 11, further comprising:
    calculating a target phase change across each of the plurality of SWG sections, wherein each of the target phase changes corresponds to a desired wavefront shape in a respective beam of light to be transmitted or reflected through the plurality of SWG sections;
    determining ridge widths, ridge period spacings, and ridge thicknesses corresponding to the target phase changes for each of the plurality of SWG sections; and
    fabricating the plurality of SWG sections to have the determined ridge widths, ridge period spacings, and ridge thicknesses.

13. An optical shuffle system for shuffling a plurality of beams comprising:
    a first side and a second side opposite to the first side;
    a source to output a beam of light;
    a receiver to receive the beam of light, the source and receiver being at the first side:
    a first plurality of SWG sections including at least one reflecting SWG section at the second side; and
    a second plurality of SWG sections including at least one transmissive SWG section at the first side,
    the reflecting SWG section and the transmissive SWG section defining at least a portion of an optical path of the beam of light such that, in operation, the receiver receives the beam of light from the source; and
    wherein the first plurality of SWG sections implement different respective shuffling functions and the second plurality of SWG sections implement different respective shuffling functions; and wherein at least a portion of the first plurality of SWG sections are formed together continuously as a substantially planar sheet, and at least a portion of the second plurality of SWG sections are formed together continuously as a substantially planar sheet.

14. The optical shuffle system according to claim 13, wherein the reflecting SWG section is formed of a plurality of ridges having ridge widths, ridge thicknesses, and ridge period spacings selected to control phase changes in different portions of a beam of light so that the beam of light is reflected by the reflecting SWG section in a specific direction.

15. The optical shuffle system according to claim 13, wherein the transmissive SWG section is formed of a plurality of ridges having ridge widths, ridge thicknesses, and ridge period spacings selected to control phase changes in different portions of a beam of light transmitted through the transmissive SWG section so that the beam of light is deflected by the SWG section in a specific direction.

* * * * *